G. A. MEAD.
RAIL BOND AND METHOD OF MANUFACTURING IT.
APPLICATION FILED JUNE 2, 1916.
1,297,381.
Patented Mar. 18, 1919.
2 SHEETS—SHEET 1.
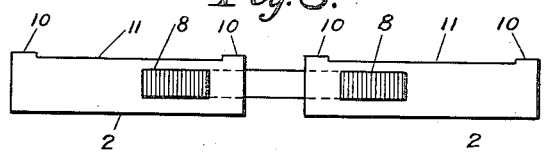
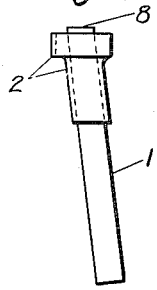
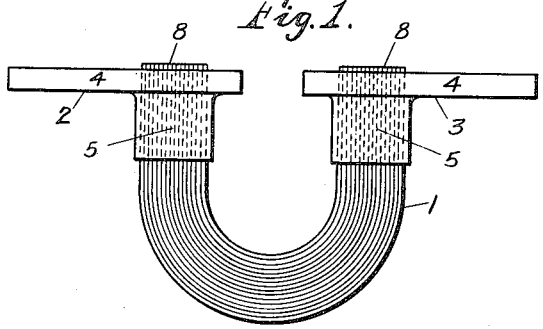
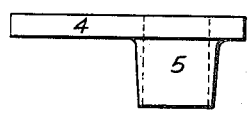
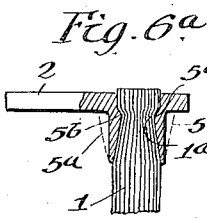
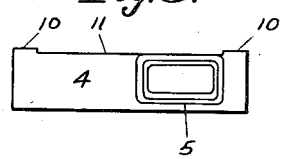
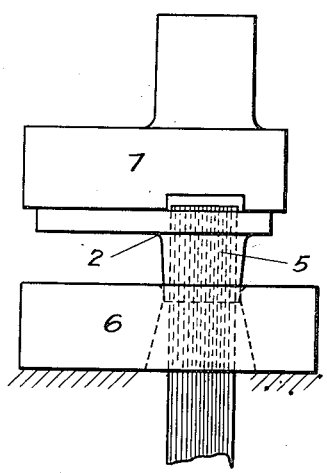
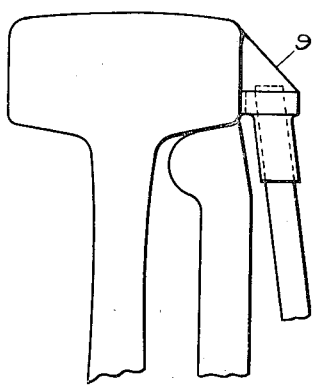
Witnesses
Otis Miller
Floyd G. Bovard
Inventor
George A. Mead,
By W. A. Darrah.
Attorney

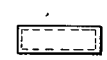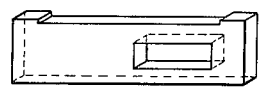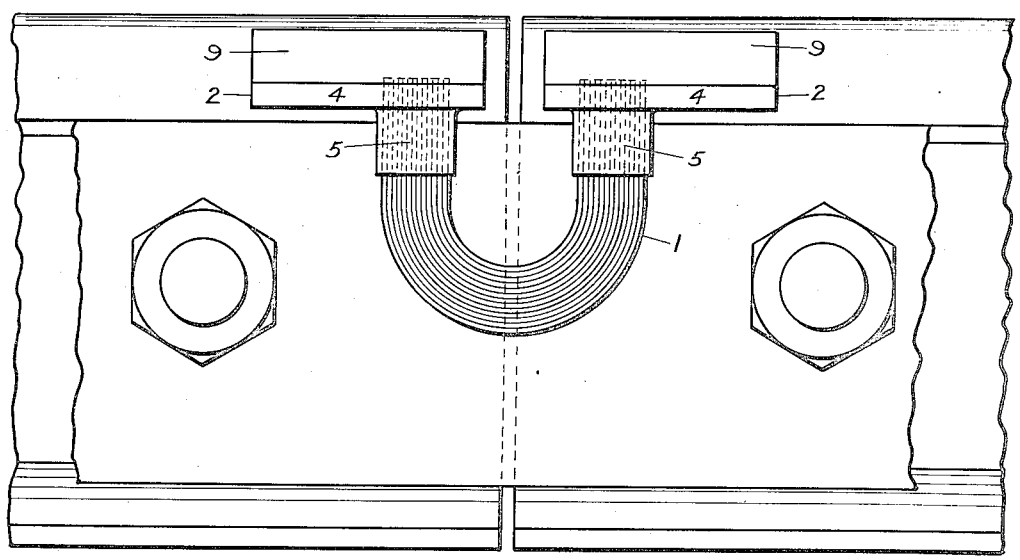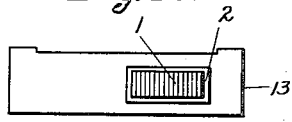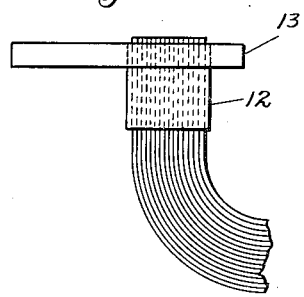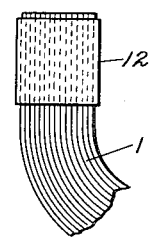

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

RAIL-BOND AND METHOD OF MANUFACTURING IT.

1,297,381.  Specification of Letters Patent.  Patented Mar. 18, 1919.

Application filed June 2, 1916. Serial No. 101,419.

*To all whom it may concern:*

Be it known that I, GEORGE A. MEAD, a citizen of the United States, residing at Mansfield, in the county of Richland and State of Ohio, have invented certain new and useful Improvements in Rail-Bonds and Methods of Manufacturing Them, of which the following is a specification.

This invention relates to improvements in rail bonds and the methods of manufacturing them.

One object is to produce a bond which can be welded to a rail, thereby forming an integral union with the rail and giving a high degree of efficiency, both electrically and mechanically.

Another object of my invention is to produce a bond which can be so welded to the rail as to make use of the oxy-acetylene flame or a flame of a similar nature or by the electric arc as the source of heat.

Another object of my invention is to produce a rail bond such that the strength of the union between the welding-metal and the bond terminal will be greater for a given area of contact than the strength between the welding-metal and copper, which is the usual metal from which rail bond terminals are constructed.

With these and other objects in mind, which will appear later, the same consists in the novel construction, combination, arrangement and manner of assembling the various parts hereinafter more fully described and then claimed.

Referring to the drawings—Figure 1 is a side elevation of my bond.

Fig. 2 is an end elevation taken at right angles to Fig. 1.

Fig. 3 is a top plan view of Fig. 1.

Fig. 4 is a side elevation of one of the terminals showing to better advantage the preferred shape before assembling.

Fig. 5 is a bottom plan view of Fig. 4.

Fig. 6 is a view to represent the manner in which the parts of my bond are assembled.

Fig. 6ª is a sectional view of the parts assembled in the manner shown by Fig. 6.

Figs. 7 and 8 are end and side elevation views respectively, showing my bond attached to the rail and giving a better idea of the relation of the bond to the rail in a preferred position on the rail.

Figs. 9 and 10 are elevation and top plan views of a modified form of terminal within the scope of my invention in which the terminal is made in detachable parts.

Fig. 11 is an elevation of one part of Figs. 9 and 10.

Fig. 12 is a perspective view of one part of Figs. 9 and 10.

Figs. 13 and 14 show a modification of the sleeve 12 in Fig. 11 and differs from 12 in Fig. 11 in that it is closed at one end.

In bonding or electrically connecting the adjacent ends of rails it is desirable to make the connection as permanent and efficient electrically as possible. One of the objections found to most of the bonds now used is that they are held to the rail by bolts, rivets, expanding pins, etc., and in time loosen up and lose their efficiency as a conductor of current between rails which would not be the case if they were welded to the rail thereby forming an integral union and a connection of high and permanent efficiency.

With this in view I have devised a bond which can be welded to the rail by economical means thereby forming an integral connection and the construction of my bond is such that I secure the best mechanical connection between the various parts.

In bonds to be welded to rails it has been customary to construct the entire bond of copper on account of the high electrical conductivity of copper, but I have found in bonds so constructed and welded that the mechanical union between the copper terminal of the bond and the welding-metal is not all that can be desired.

A source of heat quite generally used in welding bonds to rails and the one which I prefer to use in installing the bond to the rail is the oxy-acetylene flame which gives a very intense, concentrated heat of about 6,000 degrees Fahrenheit, or the electric arc which produces about the same results; the effect is to rapidly heat the rail surface and bond terminal surface to the melting point at which time metal is applied in the form of a small rod or wire to the place of application of heat which will at once melt the rod and the molten metal will unite and alloy with the molten metal on the surface of the bond terminal and rail forming an integral union.

The molten metal can be caused to flow in most any direction by properly directing the force of the flame as the flame produces a driving effect. This is illustrated in Fig. 7 where the welding metal is indicated by numeral 9 and is shown as forming a sloping face which is produced by properly directing the flame against the welding-metal while in a molten condition.

Bonds having copper terminals and applied as just described do not, I have found, have as strong a mechanical union between the welding-metal and the terminal as where the bond terminal is made of some other metal as for instance, a ferrous metal such as steel or iron, an alloy in which iron predominates, or a nickel alloy such as Monel metal. Therefore to produce the best results, and at the same time to use iron or steel, etc., in the terminal, I cause the end of the bond body, usually of copper, to extend through the terminal and in such a manner that when the bond is installed properly to a rail, the body and the terminal will each be integrally and directly united to the rail through the medium of the attaching metal, as shown in Figs. 7 or 8.

To carry out the above, I have found it necessary to construct my bond quite differently from others as will be understood from the following description and reference to the figures.

I first form up a body 1 of flat, copper ribbon or stranded copper cable or I may, in some cases, make the body of iron or steel or nickel alloy. Using a laminated or stranded body gives greater flexibility over that of a solid body. The terminals 2 and 3 are made of iron, steel, an alloy in which iron predomaintes or a nickel alloy and are produced either by drop forging or casting and consist in my preferred form of two parts; namely, a shelf 4 and a sleeve 5. The shelf is a flat surface on which to build up the welding-metal 9; the sleeve 5 which is integral with or which may be detachably connected to the shelf 4 is recessed throughout its length and the passage is slightly larger than the cross section of the body, one end of which is inserted into the sleeve as shown in Fig. 1.

I have found in using a copper body 1 and a ferrous or nickel alloy terminal that the union between the copper body and the welding-metal 9 is not as strong mechanically as the union between the shelf 4 and the welding-metal 9, therefore, it is desirable to strongly compress the sleeve onto the body thereby making a strong mechanical union between the body 1 and the terminal, preventing the possibility of the joint between the body 1 and the welding-metal 9, tearing loose.

To facilitate the application of the welding flame into the corner formed by the rail and bond terminal, I offset the terminal from the rail slightly, as shown by the numeral 11 and this is accomplished by placing feet or projections 10 on the terminals. This prevents a reflection of the flame from the extreme corner by allowing its escape through the slot formed by the feet 10.

Figs. 4 and 5 show the terminal 2 of Fig. 1 before being assembled and it will be noticed that the sides of the sleeve 5 are tapered. This is done purposely so that by inserting the small end of the sleeve, 5, with the body 1 inserted in the sleeve, in the die block 6 and pushing the sleeve into the opening in the die block by the compression head 7, the sides of the sleeve will be forced inwardly thereby tightly gripping the body 1, the compression will be very slight at the point where the body leaves the terminal and be a maximum next to the shelf 4, thereby eliminating danger of crushing or injuring the body at the leaving point of the sleeve.

As shown in Fig. 6$^a$ the compression of the die block 6 (as in Fig. 6) presses the sleeve 5, which is tapered on the outside before application, as shown in Fig. 4, and as indicated by the broken line 5$^a$ in Fig. 6$^a$, so that the taper is on the inside forming the inward projection 5$^b$, and thereby tightly compressing and gripping or holding the portion of 1$^a$ of the bond body. Forcing the sleeve into the die block tends to press the metal thereof upwardly and inwardly, as shown.

The relative location of the shelf 4 and the sleeve 5 may be changed to suit requirements, also the shape of the parts and even the method of attaching the body 1 to the terminal may differ from what I have shown and described without departing from the spirit of my invention.

I have found it advantageous to allow the end of the body 1 shown by numeral 8 to extend beyond the face of the opening through the sleeve, as by doing so, I am assured of properly uniting the welding-metal 9 and the end of the body 1, although this is not absolutely necessary and the end of sleeve 5 can be closed.

The best location for the bond is on the side of the ball of the rail as indicated in the Fig. 7, but it can be applied, by modifying the shape, to other locations on the rail as for instance, on the web or base. When applied to the ball of the rail, I prefer to do so as shown by Figs. 7 and 8, applying the welding metal so as to produce a bevel or sloping face with the outer face of the welding-metal sloping upward and toward the rail surface thereby offering little opportunity of the bond being torn off by wagon wheels or horses' hoofs at street crossings or by double-flanged wheels or other causes at other points along the track.

A desirable modification of my invention is that I can produce the same results by making the parts of the terminal detachably connected as shown in Figs. 9 and 10. In Fig. 11 the numeral 1 shows the body as previously and 12 shows the sleeve separate from the shelf 13, Fig. 9, and the sleeve 12 is compressed on or otherwise attached to the body 1. Fig. 12 shows the shelf arranged to be slipped over the end of the sleeve 12 and in the assembled condition is represented in Figs. 9 and 10, the shelf being shown by numeral 13. This form of construction meets fully the purpose of my invention the same as the integral combination of shelf and sleeve shown in Fig. 4.

A bond constructed with terminals as shown in Fig. 11, falls also within the scope of my invention, and will be found useful in many cases where the shelf 13 is not necessary.

A bond constructed using the part shown in Figs. 13 and 14 in place of part 12 in Figs. 9 or 11, is a modification of value as the thin end covering the extreme ends of the body 1 will, under the action of the intense welding heat, be melted and form a welded union with the body 1 at the time of installation of the bond.

In welding my bond to the rail, I can use any suitable metal as a welding-metal but I have found that copper, phosphor copper or some of the bronzes give the best results and have high electrical conductivity.

It will be apparent to one skilled in the art that my bond, as described above and its application, possesses the advantages of a copper body connecting the two rails and is welded to the rail by metal of equal conductivity or close thereto when copper or bronze welding-metal is used and hence the electrical resistance from rail to rail is low; also the bond terminal being of iron or steel or other similar material, the mechanical union between the welding-metal and the terminal is very strong; the union between the welding-metal and rail surface is similar to that of the terminal; and since the body of the bond is attached very securely to the terminal as well as to the welding-metal that the bond as a whole possesses high efficiency both electrically and mechanically when applied to the rail as described.

While I have herein shown and particularly described the preferred embodiment of my invention, I do not wish to be limited to the precise structure or application shown and described, as modifications may readily be made therein without departing from the spirit of my invention.

Having now described my invention, I claim as new and desire to secure by Letters Patent—

1. A rail bond comprising a body and terminals therefor, having a higher melting point than the body, the terminals each comprising a shelf projecting from the body and in a plane other than parallel thereto and provided with means projecting from the shelf for attaching it to the body.

2. A rail bond comprising a body composed of a plurality of flexible members, and a terminal for each end of the body for engaging and holding the members together at the end with a projecting portion which extends in a plane other than parallel to the said holding portion and having means to offset it from the face of the rail, the terminal being composed of a metal having a higher melting point than the body.

3. A rail bond comprising a body having each end encircled by a sleeve, with a projection extending from the sleeve, the sleeve and projection being composed of ferrous metal and the projection having means to offset it from the face of the rail.

4. A rail bond comprising a body having each end encircled by a sleeve, with a projection extending from the sleeve, the sleeve and projection having a higher melting point than the bond body, and the projection having means to offset it from the face of the rail.

5. A rail bond comprising a body having one end surrounded by a sleeve, with a shelf extending therefrom in a plane other than parallel to the axis of the sleeve and having projecting feet to offset the sleeve and shelf from the face of the rail, the sleeve and shelf being composed of ferrous metal.

6. A rail bond comprising the combination of a body and terminals attached to the ends thereof; the terminals comprising a sleeve to encircle the body, a shelf member on which to support an attaching metal and means for offsetting the terminal from the rail, the sleeve and shelf being composed of ferrous metal.

7. The combination with a rail; of a bond comprising a body having each end encircled by a sleeve, provided with a projection extending around the sleeve; the extremity of the body protruding beyond the sleeve; and attaching metal, which integrally unites the projection and the protruding end of the bond body each to the rail and incases therein the protruding end of the bond body.

8. A rail bond for attaching by welding consisting of a flexible body, a sleeve composed of metal having a higher melting point than the bond body adjacent the end of the body and means on the sleeve for offsetting it from a rail providing a space therebetween.

9. A rail bond for attaching by welding consisting of a flexible body having its ends provided with sleeves with a projection extending around each sleeve, the sleeve and projection composed of a metal having a higher melting point than the body.

10. A rail bond for attaching by welding consisting of a flexible body having one end provided with a sleeve with a projection extending around the sleeve, the sleeve and projection composed of metal having a higher melting point than the body and means for offsetting the bond end from the rail to provide a space therebetween.

11. A rail bond for attachment by welding consisting of a body having one end encircled by a sleeve with a projection extending around the sleeve.

12. In a rail bond adapted for welding to the rail by the oxy-acetylene or other gaseous flame process, and consisting of a flexible body portion incased by a sleeve, at the end thereof, external means provided on said sleeve which is adapted to catch, retain and support the fused filling metal used in making the weld during the welding process so that said filling metal can be built up against the surface of the rail in overlapping relation to said sleeve and welded to the end of the bond, and means provided in the sleeve to lock said flexible body portion to said sleeve.

13. In a rail bond adapted to be welded to a rail consisting of a flexible body incased in a sleeve at the end thereof, a shelf projecting from the sleeve and means in the sleeve to lock the body to the sleeve.

14. In a rail bond a flexible body, a sleeve having a higher melting point than the body and surrounding the body portion at or near the end thereof and means provided in the sleeve for locking the sleeve to the body.

15. A rail bond consisting of the combination of a flexible body, a sleeve composed of a metal having a higher melting point than the body encircling the body at the end thereof, means provided in the sleeve to lock the sleeve to the body, external means on the sleeve adapted to catch, retain and support attaching metal for securing the bond to a rail such that the attaching metal can form an integral union with the sleeve, the external means and the bond body for integrally uniting each to a rail.

In testimony whereof I affix my signature in the presence of two witnesses.

GEORGE A. MEAD.

Witnesses:
  W. W. HUNZICKER,
  G. H. BOLUS.